(12) United States Patent
Guichard et al.

(10) Patent No.: US 9,248,598 B2
(45) Date of Patent: Feb. 2, 2016

(54) QUICK HEATING AND COOLING MOLD

(71) Applicant: ROCTOOL, Le Bourget du Lac (FR)

(72) Inventors: Alexandre Guichard, La Chapelle du Mont du Chat (FR); Jose Feigenblum, Saint Paul (FR)

(73) Assignee: ROCTOOL, Le Bourget du Lac (FR)

( * ) Notice: Subject to any disclaimer, the term of this patent is extended or adjusted under 35 U.S.C. 154(b) by 0 days.

(21) Appl. No.: 14/408,827

(22) PCT Filed: Jun. 19, 2013

(86) PCT No.: PCT/EP2013/062817
§ 371 (c)(1),
(2) Date: Dec. 17, 2014

(87) PCT Pub. No.: WO2013/190020
PCT Pub. Date: Dec. 27, 2013

(65) Prior Publication Data
US 2015/0165665 A1 Jun. 18, 2015

(30) Foreign Application Priority Data
Jun. 19, 2012 (FR) ..................................... 12 55756

(51) Int. Cl.
*B29C 45/73* (2006.01)
*H05B 6/42* (2006.01)
*B29C 33/06* (2006.01)
*B29C 45/38* (2006.01)
*B29C 45/27* (2006.01)
*B29C 33/38* (2006.01)

(52) U.S. Cl.
CPC ............. *B29C 45/7331* (2013.01); *B29C 33/06* (2013.01); *B29C 45/73* (2013.01); *H05B 6/42* (2013.01); *B29C 33/38* (2013.01); *B29C 45/27* (2013.01); *B29C 45/38* (2013.01); *B29C 45/7312* (2013.01); *B29C 2045/7368* (2013.01); *B29K 2905/08* (2013.01); *B29K 2905/10* (2013.01); *B29K 2907/04* (2013.01)

(58) Field of Classification Search
CPC ...... B29C 45/7312; B29C 45/27; B29C 45/38
USPC ......................................... 425/547, 548, 552
See application file for complete search history.

(56) References Cited

U.S. PATENT DOCUMENTS

| | | | | |
|---|---|---|---|---|
| 2,520,348 A | * | 8/1950 | Tama | ..................... B22D 17/04 |
| | | | | 425/548 |
| 2009/0239023 A1 | * | 9/2009 | Olin | ................... B29C 45/2642 |
| | | | | 425/547 |
| 2010/0201040 A1 | | 8/2010 | Guichard et al. | |

(Continued)

FOREIGN PATENT DOCUMENTS

EP 1894442 A1 3/2008
EP 2199057 A1 6/2010

(Continued)

*Primary Examiner* — Tim Heitbrink
(74) *Attorney, Agent, or Firm* — Im IP Law PLLC; C. Andrew Im

(57) ABSTRACT

A mold having a first part with a carcass with a molding zone added thereto to provide a mechanical interface between the molding zone and the carcass. Inductors of the mold extend along a longitudinal direction in cavities between the mechanical interface and the molding zone. A cooling device of the mold extends at the mechanical interface between the molding zone and the carcass.

14 Claims, 2 Drawing Sheets

(56) References Cited

U.S. PATENT DOCUMENTS

2013/0334741 A1* 12/2013 Takai .................. B29C 33/02
 425/552
2015/0151471 A1* 6/2015 Feigenblum ....... B22D 17/2218
 425/548

FOREIGN PATENT DOCUMENTS

| JP | S6378720 A | 4/1988 |
| JP | H05337997 A | 12/1993 |
| WO | 2006/112571 A1 | 10/2006 |
| WO | 2008/039485 A1 | 4/2008 |

* cited by examiner

QUICK HEATING AND COOLING MOLD

RELATED APPLICATIONS

This application is a §371 application from PCT/EP2013/062817 filed Jun. 19, 2013, which claims priority from French Patent Application No. 12 55756 filed Jun. 19, 2012, each of which is herein incorporated by reference in its entirety.

TECHNICAL FIELD OF THE INVENTION

The invention relates to a quick heating and cooling mold. More particularly, the invention relates to an induction heating and quick cooling device for a mold, designed for injection molding plastic or metal in the liquid or pasty state.

BACKGROUND OF THE INVENTION

The document EP 1 894 442 in the name of the applicant describes a mold equipped with an induction heating device and cooling device using the circulation of a heat-transfer fluid. That device of the prior art comprises a mold made up of a fixed part and a mobile part. Each of the parts can receive an induction heating circuit and a cooling circuit. Each of these parts consists of a carcass to which a part is added to make up the molding surface, giving its final shape to the workpiece made in the mold For each part of the mold, the molding surface is the surface to heat and cool, which surface is in contact with the material making up the workpiece. The inductors are placed in cavities that extend under said molding surface. These cavities are most often made by grooving the underside of said molding zone at the interface between that zone and the carcass of the mold. For its part, the cooling circuit is made with conduits drilled in the carcass, which are further away from the molding surface. That cooling circuit carries out both the cooling of the carcass, which, in a common embodiment, is made in material that is relatively insensitive to induction heating, and the cooling of the molding surface. Finally, the carcass of each part is mechanically joined to a support.

That configuration provides satisfactory results but is difficult to implement when the mold is large or when the molding surface has a complex shape. In such conditions, the temperature gradients that occur both during heating and cooling lead to the distortion of the shape of the mold overall, and secondly, on a smaller scale, differential distortion between the molding zone and the carcass, which differential distortion leads to poor contact between these two elements and has an adverse effect on the quality of the cooling, by creating thermal barriers between said two elements, due to the differential distortion.

OBJECT AND SUMMARY OF THE INVENTION

The invention is aimed at remedying the drawbacks of the prior art and thus relates to a mold including a first part comprising a carcass to which a molding zone is added, making up a mechanical interface between said molding zone and the carcass, and comprising inductors extending along a direction known as the longitudinal direction, in cavities between said interface and the molding zone and a cooling device extending at the interface between said molding zone and the carcass. Thus, the heating and cooling devices are located as close to the interface as possible, so the differential distortions do not affect thermal conduction between the heating and cooling devices and the molding zone. The inductors are easily integrated in shallow grooves, forming cavities after the molding zone is assembled with the carcass, making it possible to reduce the machining cost of such a mold.

The invention can be implemented advantageously in the embodiments described below, which may be considered individually or in any technically operative combination.

Advantageously, the mold according to the invention comprises, in one exemplary embodiment, at the interface between the carcass and the molding zone, a sheet made of heat-conducting material that can make up for the differences in shape between the molding zone and the carcass.

In one particular embodiment, the sheet is made of graphite.

In an alternative of that embodiment, said sheet is made of nickel (Ni).

In another alternative of that embodiment, said sheet is made of copper (Cu).

Advantageously, said sheet is brazed on the molding zone.

In a second embodiment, compatible with the previous one, the inductors are enclosed in sealed sleeves that can resist temperature of at least 250° C. and the cooling device consists in a heat-transfer fluid flowing in the cavities around the inductors.

In a third embodiment, the cooling device consists in the flow of a dielectric fluid in the cavities around the inductors. Advantageously, the dielectric fluid is an electrically insulating oil.

In a fourth embodiment, the cooling device comprises a cavity full of fluid exhibiting a phase transition under the effect of temperature, the latent heat of transformation of which is sufficient to absorb the heat of the molding zone at a determined temperature.

In a fifth embodiment, the cooling device includes the injection of gas in the cavities around the inductors.

Advantageously, the gas is injected in a direction transversal to the longitudinal direction. Thus, a turbulence is created in the air flow, which turbulence favors thermal exchange. That turbulence depends on the gas injection pressure and the angle between the injection conduit and the longitudinal direction of the cavities.

Advantageously, the cooling device of the mold according to the invention comprises, in this last embodiment, several gas injection points on the length of the cavity along the longitudinal direction.

Advantageously, the gas is air, injected at a pressure above 80 bars. The use of air as cooling fluid simplifies the implementation of the device, particularly regarding sealing problems.

In one particular embodiment, the mold according to the invention comprises a second induction circuit remote from the first one in relation to the interface and supplied with current by a separate generator.

In one advantageous embodiment, the carcass and the molding zone are made of iron (Fe) and nickel (Ni) alloy of the INVAR type, the Curie point of which is close to the transformation temperature of the molded material. Thus, when the material making up the carcass and the molding zone is ferromagnetic, therefore sensitive to induction heating, its expansion coefficient is low. When, as the material heats, its temperature moves closer to the Curie point, it becomes relatively insensitive to induction heating. Thus, this constitution makes it possible to control the differential expansion of the carcass and the molding zone but also that of the carcass and in relation to the mechanical support of said carcass on the press.

BRIEF DESCRIPTION OF THE DRAWINGS

The invention is described below in its preferred embodiments, which are not limitative in any way, and by reference to FIGS. 1 to 6, wherein.

DETAILED DESCRIPTION OF THE EMBODIMENTS

Figure 1:
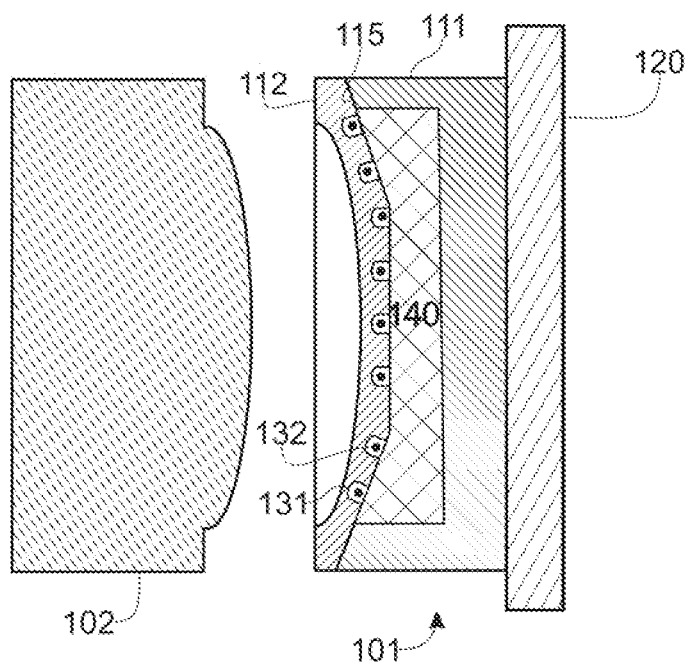
FIG. 1 is a transverse sectional view of a general exemplary embodiment of the mold according to the invention.

In FIG. 1, according to a first exemplary embodiment, the mold according to the invention comprises a first (101) part and a second (102) part. The description below is provided with the first part (101) as the reference. Those skilled in the art will adapt all the arrangements and embodiments described relating to this first part (101) to the second part of said mold. In this exemplary embodiment, the first part (101) is fixed to a mechanical support (120). Said first part of the mold comprises a carcass (111) fixed to that mechanical support (120) and receives at its distal end of said support (120) a molding zone (112) added to said carcass (111) by mechanical fastening (not shown). Thus, a mechanical interface (115) is created between the carcass and the molding zone. The mold comprises a heating device comprising inductors (132) extending in cavities (131) at the interface (115) between the molding zone (112) and the carcass (111), wherein said cavities are in this exemplary embodiment obtained by grooving the inside of the molding zone. A cooling device (140) represented here schematically also extends at the interface (115).

Figures 2, 3:
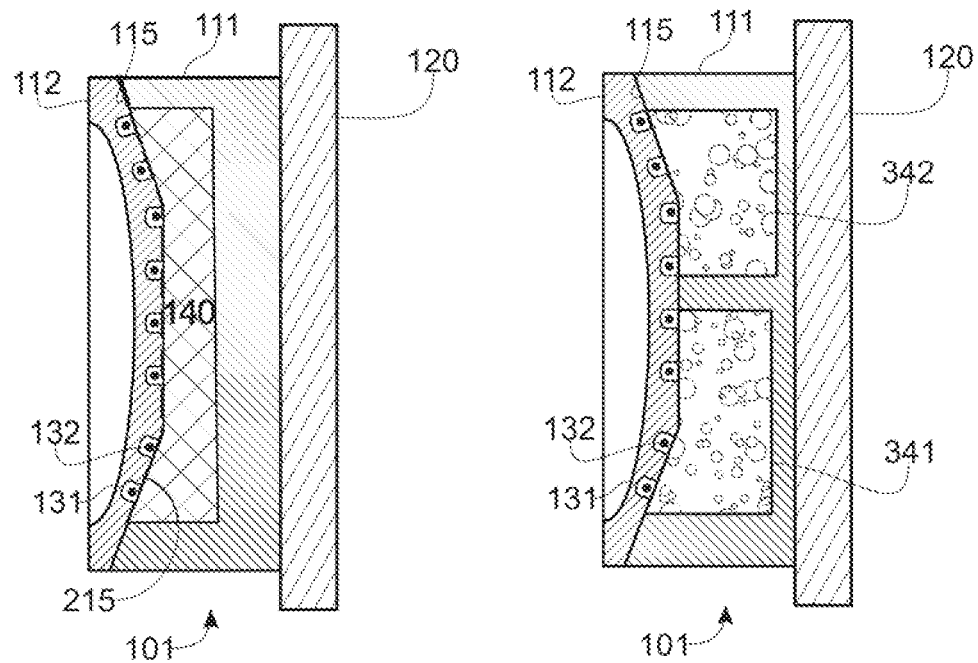
FIG. 2 is a transverse sectional view of a part of the mold according to the invention in one embodiment comprising a sheet between the molding zone and the carcass.
FIG. 3 is a transverse sectional view of the first part of a mold according to an embodiment of the invention wherein the cooling device comprises a cavity filled with material capable of changing phases at a given temperature by absorbing latent heat of transformation.

In FIG. 2 of an exemplary embodiment, the mold according to the invention comprises a sheet (215) between the interface (115) and the cooling device. That sheet in graphite, nickel (Ni) or copper (Cu), which is heat-conducting, is capable of making up for the differences in shape between the molding zone (112) and the carcass (111) at the interface (115), so as to allow uniform contact between the carcass and the molding zone, and thus allow proper heat conduction between the two. The nature of the sheet is selected depending on the temperature to reach during molding. Advantageously, the sheet is brazed at the interface between the molding zone and the carcass, with the mold closed, using the mold heating device for the brazing. Thus the shape adaptation is perfect.

In FIG. 3, according to another exemplary embodiment, the cooling device comprises a cavity (341, 342), which is filled by a material capable of phase transition at a determined temperature, wherein that phase transition is accompanied by the absorption of high latent heat. The phase transition is fusion or vaporization. Said material is water, for example.

Figure 4:
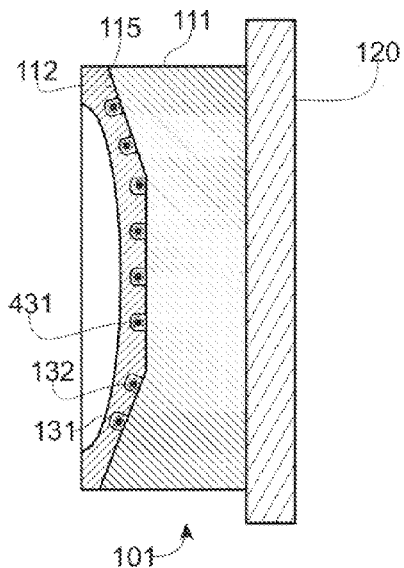
FIG. 4 is a transverse sectional view of a part of the mold according to the invention in an embodiment wherein cooling is achieved by the flow of heat-transfer fluid in the cavities receiving the inductors.

In FIG. 4, according to another exemplary embodiment of the mold according to the invention, each inductor (132) is placed in a sealed sleeve (431) that is resistant to high temperature. Depending on the target temperature for inductors, such a sleeve (431) is made of glass or silica, preferably comprising closed porosities to be both sealed and capable of withstanding the thermal shock of cooling. When the temperature of the inductors reached in operation is limited, for example for molding certain plastics, said sleeve is made of heat-shrinking polymer, for example polytetrafluoroethylene (PTFE or Teflon®) for inductor operating temperatures ranging up to 260° C. Thus, the cooling device is made up of the flow of heat-transfer fluid, for example water, in the cavities (131) receiving the inductors, wherein said inductors are insulated from contact with the heat-transfer fluid by their sealed sleeve.

Alternatively, the heat-transfer fluid is a dielectric liquid, for example a dielectric oil. This type of product is available in the market, particularly for cooling transformers. In that case, the electrical insulation of the inductors (132) is not necessary.

Figure 5:
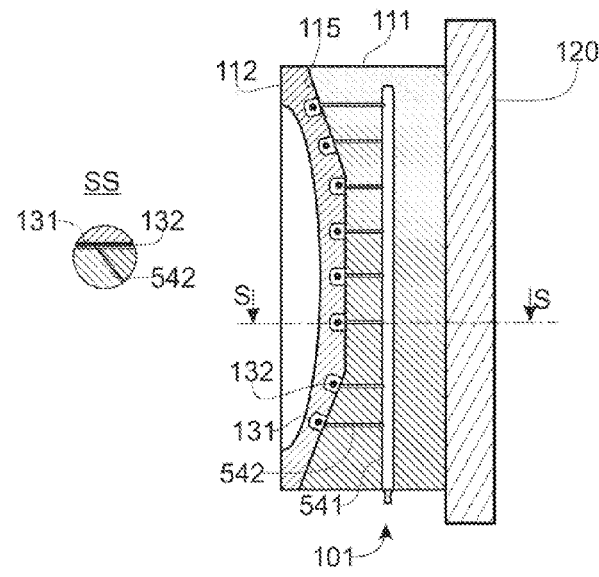
FIG. 5 is a transverse sectional view of an embodiment of a part of the mold according to the invention comprising a device for cooling by transverse injection of gas under pressure into the cavities receiving the inductors, with, in the section SS, the direction of the injectors in a longitudinal section.

In FIG. 5, according to another exemplary embodiment, cooling is carried out by injecting gas in the cavities (131) receiving the inductors (132). To improve the efficiency of the cooling, the gas is injected under pressure of about 80 bars (80·10$^5$ Pa), by a plurality of conduits (541) distributed longitudinally along the inductors (132). The injection is thus carried out at several points, along the inductors, through injection conduits (542), transversally to said inductors (132).

In section SS of a longitudinal sectional view, the injection conduit (542) is directed so that the direction of the fluid jet in the cavity of the inductor has a component parallel to the longitudinal direction. Thus, by appropriately selecting the injection angle, effective cooling is obtained by a turbulence flow of the gas along the inductor (132).

The temperature gradients present particularly in the carcass, which is fixed to the mechanical support, are liable to lead to distortions of the device or differential deformation stresses. Thus, in an advantageous embodiment, the carcass (111) and the molding zone (112) are made in an iron and nickel alloy comprising 64% iron and 36% nickel, called INVAR, with a low thermal expansion coefficient for temperatures below the Curie temperature of that material, when the material is in the ferromagnetic state, and thus sensitive to induction heating.

Figure 6:
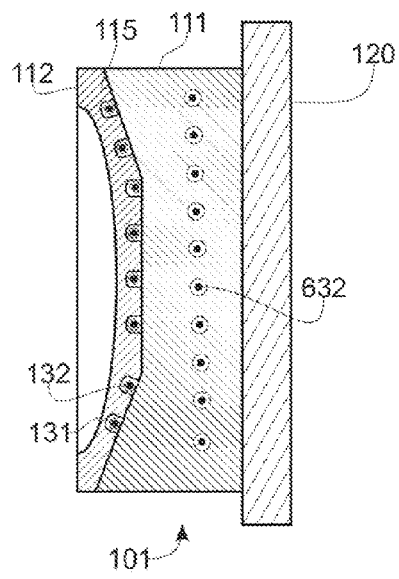
FIG. 6 is a transverse sectional view of an exemplary embodiment of a part of the mold according to the invention comprising two remote and separate induction circuits.

In FIG. 6, according to a last embodiment compatible with the previous embodiments, the mold comprises a second series (632) of inductors remote from the first. The first (132) and the second (632) series of inductors are connected to two different generators. Thus, heating is distributed dynamically between the two series of inductors, so as to limit the deformations of the parts of the mold, which deformations are generated by thermal expansion combined with the thermal gradients that occur in the heating and cooling phase.

The invention claimed is:
1. A mold comprising:
  a first part comprising a carcass with a molding zone added thereto to provide a mechanical interface between said molding zone and the carcass;
  inductors extending along a longitudinal direction in cavities between the mechanical interface and the molding zone;

a cooling device extending at the mechanical interface between the molding zone and the carcass; and a sheet comprising heat-conducting material to make up for differences in shape between the molding zone and the carcass at the mechanical interface between the carcass and the molding zone.

2. The mold according to claim 1, wherein the sheet is made of graphite.

3. The mold according to claim 1, wherein the sheet is made of nickel (Ni) or a nickel alloy.

4. The mold according to claim 1, wherein the sheet is made of copper (Cu).

5. The mold according to claim 1, wherein the inductors are enclosed in sealed sleeves that can resist temperature of at least 250° C.; and wherein the cooling device comprises in a heat-transfer fluid flowing in the cavities around the inductors.

6. The mold according to claim 1, wherein the cooling device comprises in a dielectric fluid flowing in the cavities around the inductors.

7. The mold according to claim 6, wherein the dielectric fluid is an electrically insulating oil.

8. The mold according to claim 1, wherein the cooling device comprises a cavity filled with a fluid exhibiting a phase transition at a predetermined temperature by absorbing latent heat of transformation of the molding zone.

9. The mold according to claim 1, wherein the cooling device comprises an injection device to inject a gas in the cavities around the inductors.

10. The mold according to claim 9, wherein the injection device comprises a plurality of injectors extending in a direction transversal to the longitudinal direction.

11. The mold according to claim 10, wherein the plurality of injectors are configured to inject gas on a length of the cavities along the longitudinal direction.

12. The mold according to claim 9, wherein the gas is air injected at a pressure equal to or above 80 bars ($80\times10^5$ Pa).

13. The mold according to claim 1, further comprising an induction circuit remote from the inductors in relation to the mechanical interface, the induction circuit being supplied with a current by a separate generator.

14. The mold according to claim 1, wherein the carcass and the molding zone are made of iron and nickel alloy.

* * * * *